(12) United States Patent
Takahashi

(10) Patent No.: US 12,028,494 B2
(45) Date of Patent: Jul. 2, 2024

(54) IMAGE FORMING APPARATUS INCLUDING ILLUMINATION DEVICE TO ILLUMINATE JAMMED SHEET

(71) Applicant: CANON KABUSHIKI KAISHA, Tokyo (JP)

(72) Inventor: Kakeru Takahashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/161,213

(22) Filed: Jan. 30, 2023

(65) Prior Publication Data

US 2023/0247153 A1    Aug. 3, 2023

(30) Foreign Application Priority Data

Jan. 31, 2022  (JP) ................................ 2022-013132

(51) Int. Cl.
*H04N 1/00* (2006.01)
*G03G 15/00* (2006.01)
*G03G 21/16* (2006.01)

(52) U.S. Cl.
CPC ......... *H04N 1/00546* (2013.01); *G03G 15/70* (2013.01); *G03G 21/1638* (2013.01); *H04N 1/0049* (2013.01); *H04N 1/00689* (2013.01); *G03G 2215/0035* (2013.01); *G03G 2215/00544* (2013.01); *G03G 2215/00552* (2013.01); *G03G 2221/1675* (2013.01)

(58) Field of Classification Search
CPC ............... G03G 15/70; G03G 21/1638; G03G 2215/0035; G03G 2215/00552; G03G 2221/1675; G03G 2215/0054; G03G 2215/00544; H04N 1/00546; H04N 1/0049; H04N 1/00689
See application file for complete search history.

(56) References Cited

U.S. PATENT DOCUMENTS

2014/0334834 A1* 11/2014 Katsuyama ........ G03G 15/6502
                                                    399/21
2016/0212278 A1*  7/2016 Yamazaki .......... H04N 1/32657
(Continued)

FOREIGN PATENT DOCUMENTS

JP          2009179441 A      8/2009

*Primary Examiner* — Arlene Heredia
*Assistant Examiner* — Laura Roth
(74) *Attorney, Agent, or Firm* — ROSSI, KIMMS & McDOWELL LLP

(57) ABSTRACT

An image forming apparatus includes an apparatus body, a door, a first guide, a second guide configured to move from a first position to a second position, a first illumination device, and a second illumination device. The first illumination device is configured to illuminate a door side of the second guide positioned in the second position, with the door side of the second guide being closer to the door than a conveyance center line of the conveyance path in a width direction orthogonal to a sheet conveyance direction of a sheet which is conveyed in the conveyance path. The second illumination device is configured to illuminate in a direction different from a direction in which the first illumination device illuminates, and the second illumination device is configured to illuminate a space between the first guide and the second guide positioned in the second position.

13 Claims, 10 Drawing Sheets

(56) References Cited

U.S. PATENT DOCUMENTS

2017/0227898 A1* 8/2017 Kakitani ............ G03G 21/1633
2018/0157201 A1* 6/2018 Torikata ............. G01N 21/8806
2018/0157203 A1* 6/2018 Mori .................. G03G 15/5016

* cited by examiner

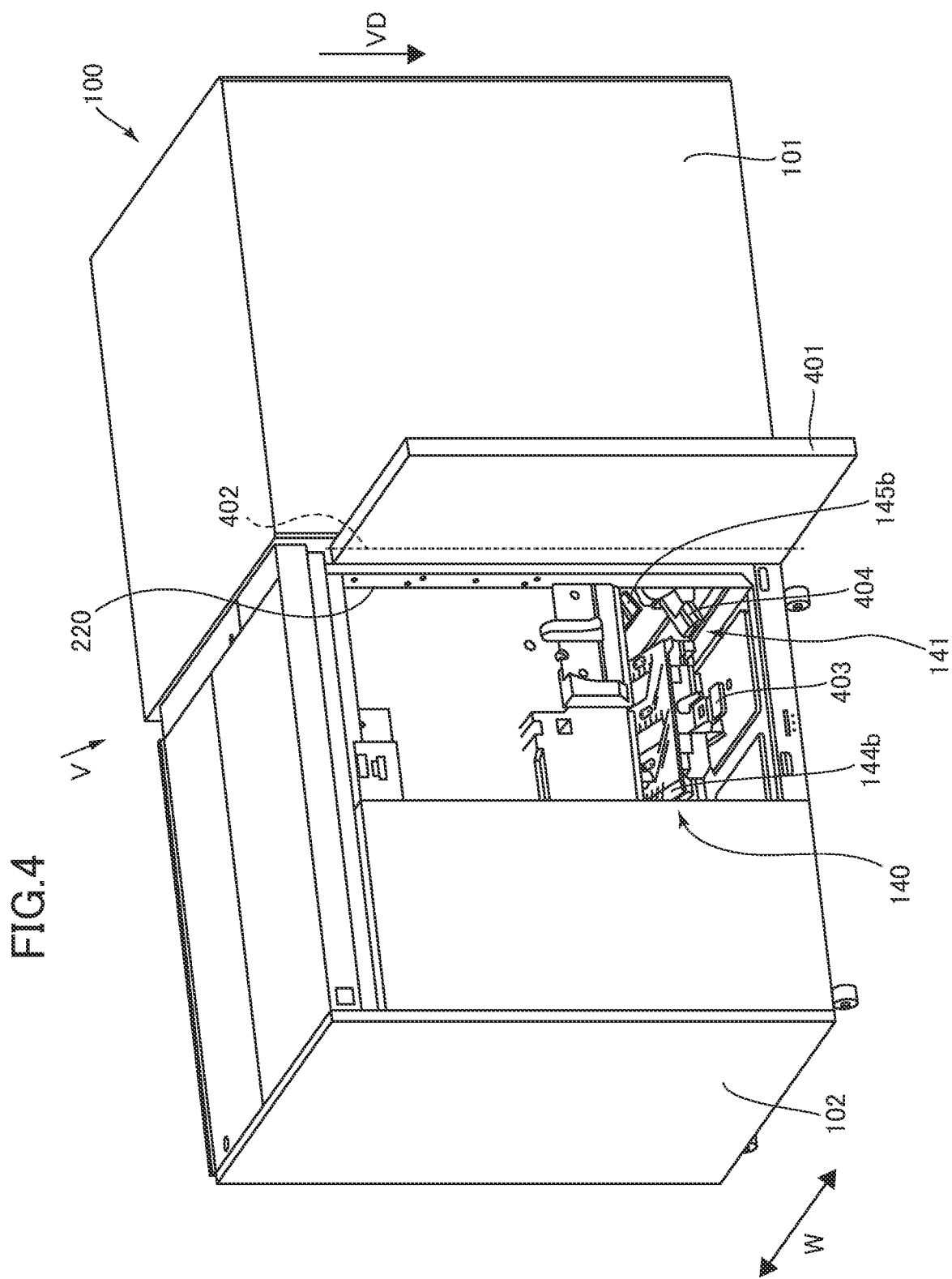

FIG.5A
FIG.5B
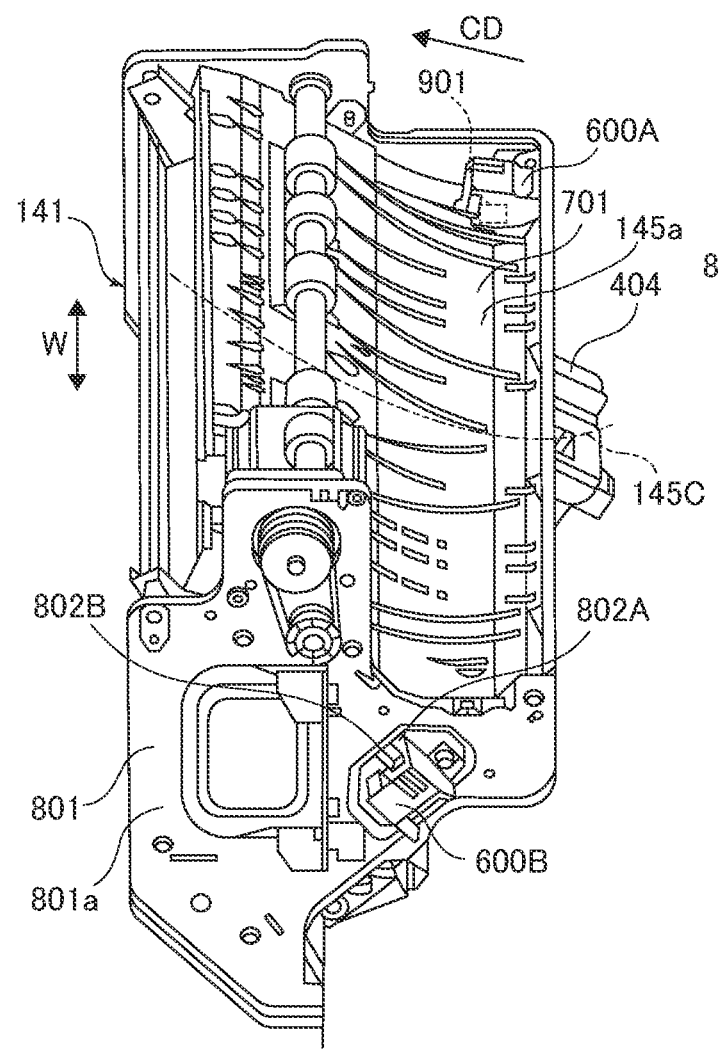
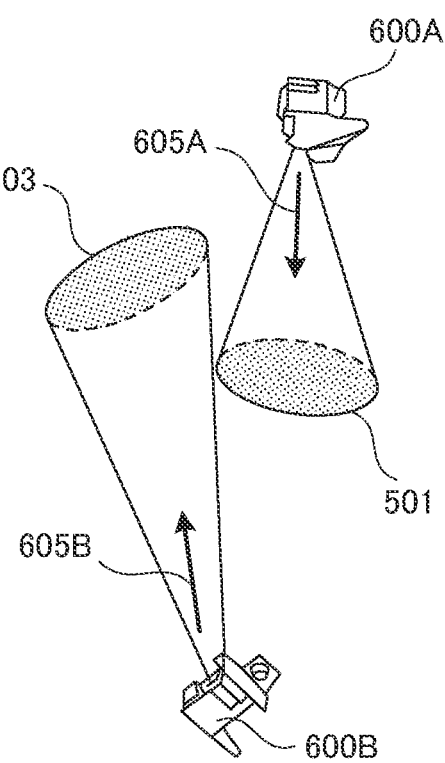

IMAGE FORMING APPARATUS INCLUDING ILLUMINATION DEVICE TO ILLUMINATE JAMMED SHEET

BACKGROUND OF THE INVENTION

Field of the Invention

This disclosure relates to an image forming apparatus forming an image on a sheet.

Description of the Related Art

In general, in image forming apparatuses such as printers and multi-function machines, opening/closing members are disposed in a variety of places in an openable and closable manner so as to process jammed sheets on conveyance paths in the apparatus. Hitherto, an image forming apparatus including a first cover and a second cover, which are opened and closed depending on where a jam has occurred, has been proposed. A first handle portion and a second handle portion are respectively disposed to the first and second covers so as to open these first and second covers. A first lamp is disposed above the first handle portion, and a second lamp is disposed below the second handle portion. By the lighting of these first and second lamps, the user can recognize which one of the first and second covers is opened.

However, in a case of an image forming apparatus described in Japanese Patent Laid-Open No. 2009-179441, even in a state where the first or second cover is opened, it is sometimes difficult for the user to find a sheet jammed inside of the apparatus. Therefore, there has been a problem in jam processability.

SUMMARY OF THE INVENTION

An image forming apparatus configured to form forming an image on a sheet includes an apparatus body, a door provided so as to be openable and closable with respect to the apparatus body, the door constituting a part of an exterior of the image forming apparatus, a first guide, a second guide configured to move from a first position to a second position so as to open a conveyance path, the first position being a position in which the second guide faces the first guide so as to form the conveyance path with the first guide, the second position being a more separated position from the first guide than the first position, the second guide being exposed in a case where the door is opened with respect to the apparatus body, a first illumination device configured to illuminate a door side of the second guide positioned in the second position, the door side of the second guide being closer to the door than a conveyance center line of the conveyance path in a width direction orthogonal to a sheet conveyance direction of a sheet which is conveyed in the conveyance path, and a second illumination device configured to illuminate in a direction different from a direction in which the first illumination device illuminates, the second illumination device being configured to illuminate a space between the first guide and the second guide positioned in the second position.

Further features of the present invention will become apparent from the following description of exemplary embodiments with reference to the attached drawings.

BRIEF DESCRIPTION OF THE DRAWINGS

FIG. 4 is a perspective view illustrating a state where a front door is opened.

FIG. 5A is a diagram illustrating a conveyance unit as viewed from an arrow V direction in FIG. 4, and FIG. 5B is a perspective view illustrating illumination directions of a first illumination device and a second illumination device.

DESCRIPTION OF THE EMBODIMENTS

First Embodiment

General Arrangement

Figure 1:
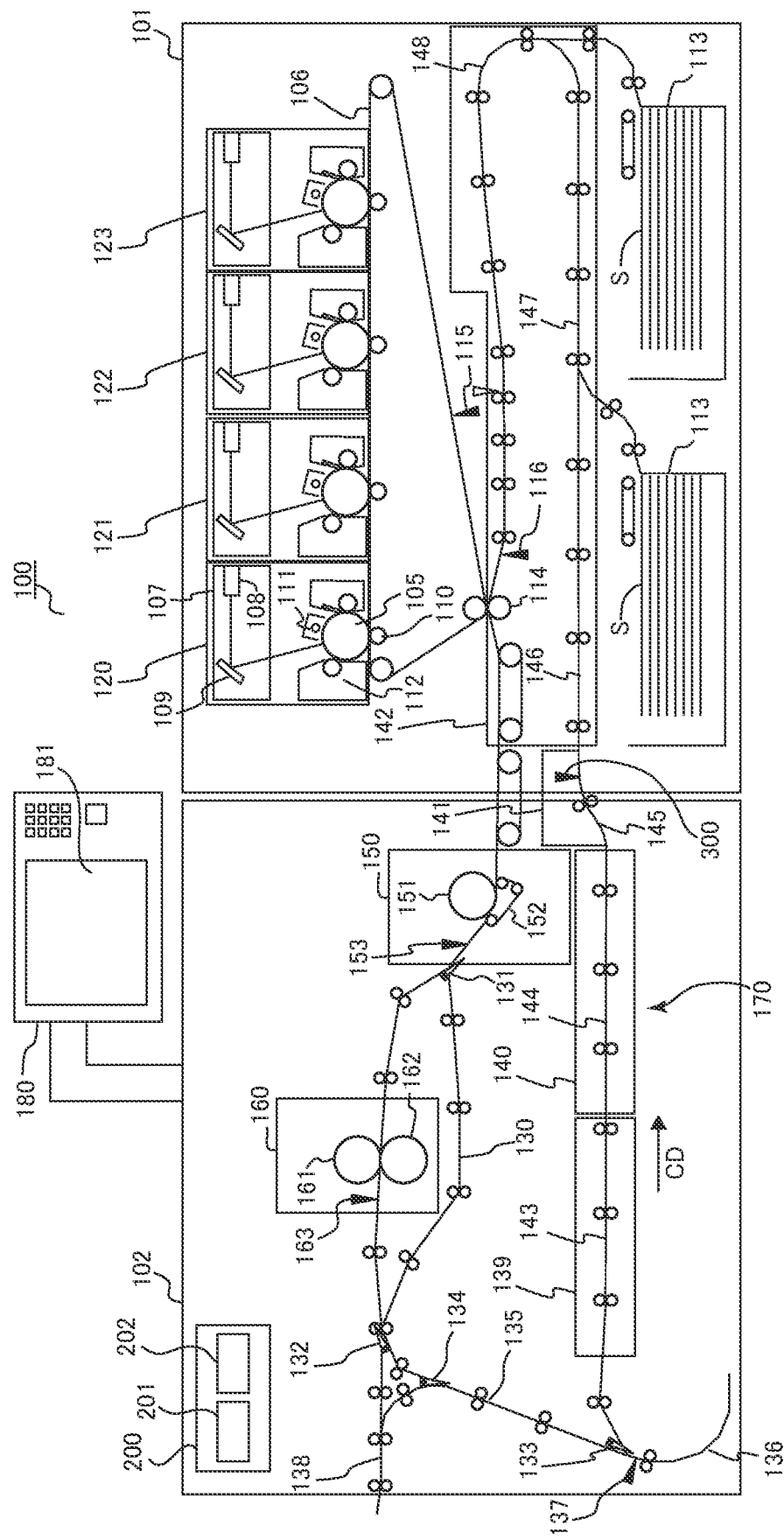
FIG. 1 is an overall schematic diagram illustrating an image forming apparatus of a first embodiment.

First, a first embodiment of this disclosure will be described. As illustrated in FIG. 1, an image forming apparatus 100 of the first embodiment includes a casing 101, a casing 102, and an operation display unit 180. The casings 101 and 102 are disposed in adjacent to each other, and the operation display unit 180 is attached to the casing 102. Various mechanisms included in an engine unit, and a control board storage portion 204 storing an engine control unit 201 and a controller 202 for performing the control of each process of printing processes (for example, a sheet feeding process) performed by each mechanism are incorporated in the casings 101 and 102. The controller 202 includes a central processing unit (CPU), a read only memory (ROM) for storing various programs, and a random access memory (RAM) used as a work area of the CPU. Further, the image forming apparatus 100 also includes a fixing process mechanism for fixing a toner image transferred onto a sheet S, a sheet feeding process mechanism of the sheet S, and a sheet conveyance process mechanism of the sheet S.

Four stations 120, 121, 122, and 123 corresponding to toners for each color of yellow, magenta, cyan, and black are disposed in the engine unit. The stations 120, 121, 122, and 123, and a primary transfer roller 110, an intermediate transfer belt 106, and a secondary transfer roller 114, described below, are included in an image forming unit which forms an image on the sheet S. Since substantially common components are included in each station, a configuration of the station 120 will be described as a representative.

The station 120 includes a photosensitive drum 105, a laser scanner 107, a charge unit 111, and a developing unit 112. To be noted, the photosensitive drum 105 and the developing unit 112 are detachable from the casing 101. The photosensitive drum 105 is charged in a uniform surface potential by the charge unit 111. The laser scanner 107 includes a laser 108 and a reflection mirror 109 for guiding a laser beam output by the laser 108 to the photosensitive drum 105. An electrostatic latent image is formed on the photosensitive drum 105 by the laser beam. The developing unit 112 develops the electrostatic latent image by using the toner, and forms the toner image on the photosensitive drum 105. This toner image is transferred onto the intermediate transfer belt 106 by the primary transfer roller 110.

The toner image of each color formed by the stations 121, 122, and 123 is also transferred onto intermediate transfer belt 106 in a manner of being superimposed on each other. Then, by the secondary transfer roller 114, a full color toner image formed on the intermediate transfer belt 106 is transferred onto the sheet S which has been conveyed by the sheet feeding process mechanism and the sheet conveyance process mechanism via conveyance paths 147 and 148. Further, an image formation start position detection sensor 115 for determining a printing start position at the time of image formation and a sheet feed timing sensor 116 for measuring a sheet feed timing of the sheet S are disposed around the intermediate transfer belt 106.

The fixing process mechanism includes a first fixing unit 150 and a second fixing unit 160, and fixes the toner image on the sheet S by heating and pressing the toner image transferred onto the sheet S. The first fixing unit 150 includes a fixing roller 151 for applying heat to the sheet S, a press belt 152 for bringing the sheet S into pressure contact with the fixing roller 151, and a first after-fixing sensor 153 for detecting the completion of the fixing. The fixing roller 151 is a hollow roller, and includes a heater inside. The second fixing unit 160 is disposed downstream of the first fixing unit 150 in a sheet conveyance direction of the sheet S. The second fixing unit 160 gives gloss (shine) and fixability to the toner image on the sheet S, which has been fixed by the first fixing unit 150. Similarly to the first fixing unit 150, the second fixing unit 160 includes a fixing roller 161, a press roller 162, and a second after-fixing sensor 163. Depending on a type of the sheet S, it is not necessary to pass the sheet S through the second fixing unit 160. In this case, so as to reduce energy consumption, the image forming apparatus 100 passes the sheet S through a conveyance path 130 without passing through the second fixing unit 160.

For example, in a case where it is set to give high gloss to the sheet S, and in a case where the sheet S is such as cardboard which requires a large amount of the heat for the fixing, the sheet S which has passed through the first fixing unit 150 is also conveyed to the second fixing unit 160. On the other hand, in a case where the sheet is standard paper or thin paper, and in a case where it is not set to give the high gloss, the sheet S is conveyed to the conveyance path 130 which bypasses the second fixing unit 160. Whether the sheet S is conveyed to the second fixing unit 160 or whether the sheet S is conveyed by bypassing the second fixing unit 160 is controlled by a pivot of a guide member 131.

Further, guide members 132 and 133 are disposed in the image forming apparatus 100. The guide member 132 guides the sheet S to a reverse conveyance path 135, or a sheet discharge path 138 which is directed toward the outside of the apparatus. The leading edge of the sheet S guided to the reverse conveyance path 135 passes through a reverse sensor 137, and is conveyed to a reverse portion 136. When the reverse sensor 137 detects the trailing edge of the sheet S, the sheet conveyance direction of the sheet S is switched. The guide member 133 guides the sheet S to a duplex conveyance mechanism 170 or the reverse conveyance path 135. The sheet S guided to the reverse conveyance path 135 by the guide member 133 is guided to the sheet discharge path 138 by a guide member 134.

The duplex conveyance mechanism 170 includes conveyance units 139, 140, and 141, which are described below. The conveyance units 139, 140, and 141 respectively include conveyance paths 143, 144, and 145. Further, a drawer unit 142 is disposed downstream of the conveyance unit 141 in a sheet conveyance direction CD. The drawer unit 142 is drawable with respect to the casing 101 in a front direction from a sheet surface of FIG. 1. A conveyance path 146, the conveyance paths 147 and 148, the sheet feed timing sensor 116, and the secondary transfer roller 114 are, for example, disposed in the drawer unit 142.

The sheet S, on whose first surface the image has been formed and which has been conveyed by the conveyance units 139, 140, and 141, is guided to the secondary transfer roller 114 again via the conveyance paths 147 and 148. Then, the image is also formed on a second surface of the sheet S by the secondary transfer roller 114, and discharged from the sheet discharge path 138 to the outside of the apparatus.

Guide Configuration of Each Conveyance Unit

Figure 2:
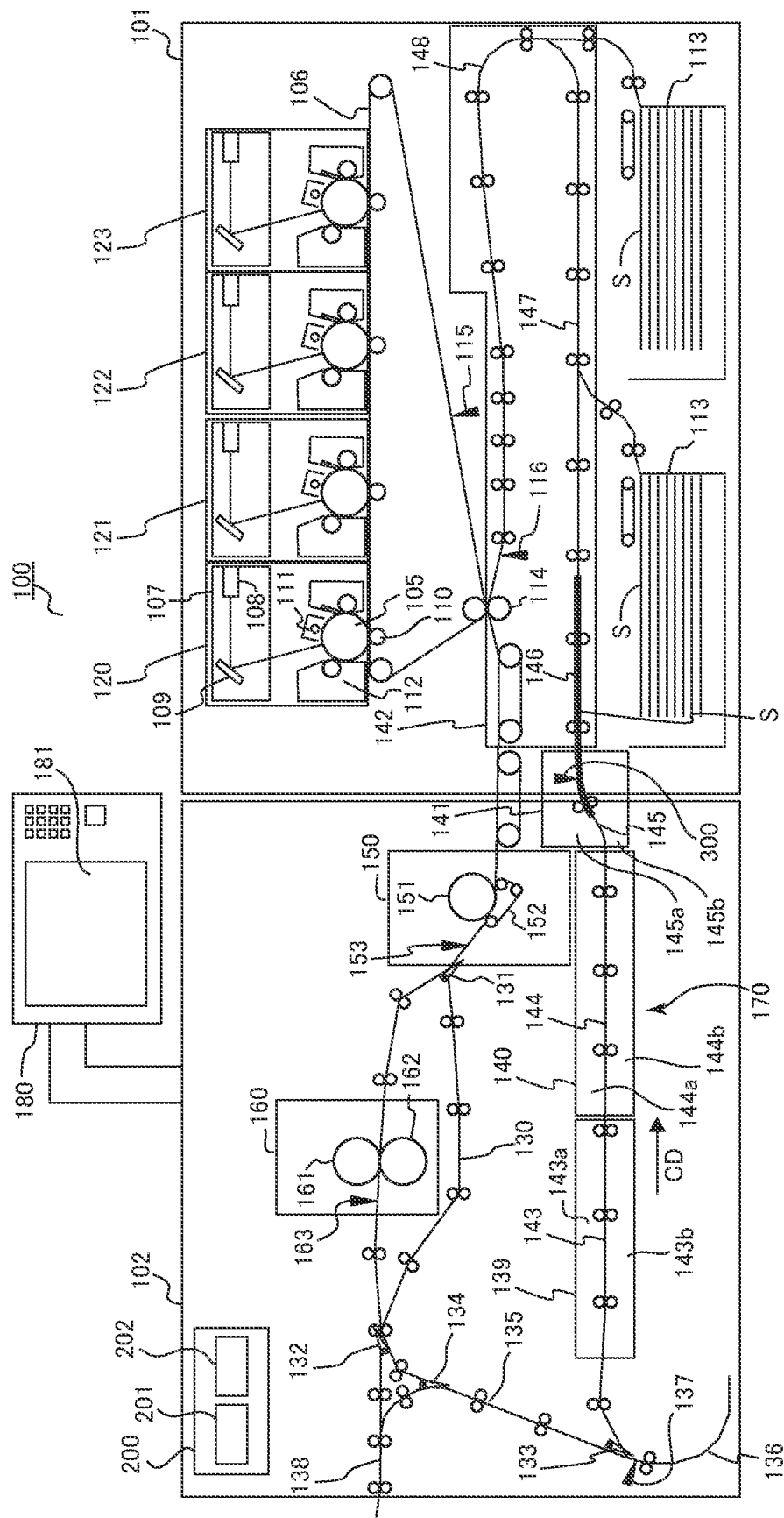
FIG. 2 is a schematic diagram illustrating a jammed sheet.
Figure 3:
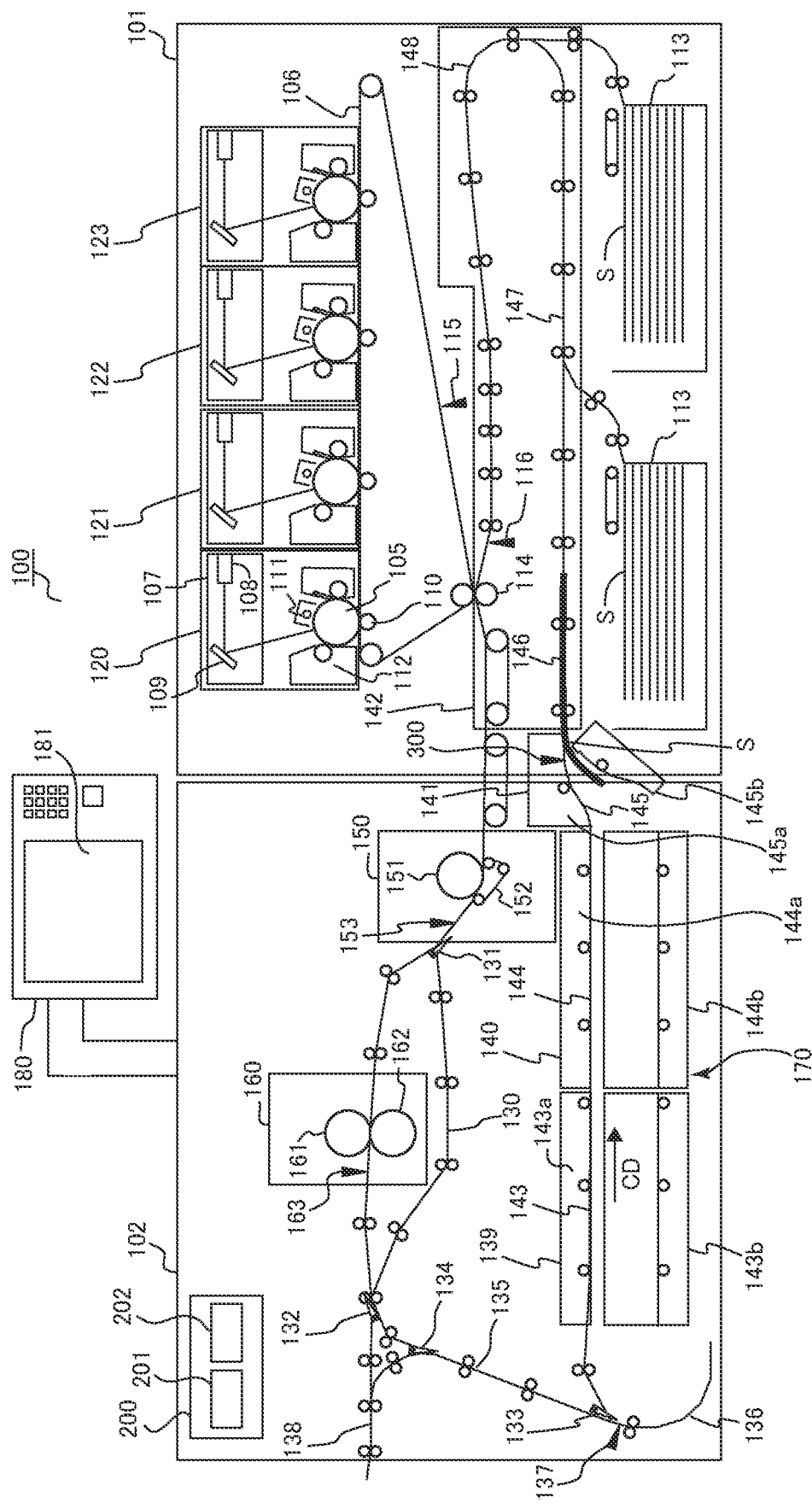
FIG. 3 is a schematic diagram illustrating a state where a lower guide is opened.

Next, configurations of guides of the conveyance units 139, 140, and 141 will be described using FIGS. 2 and 3. In examples illustrated in FIGS. 2 and 3, the sheet S is retained so as to straddle between the conveyance paths 145 and 146. Further, in FIG. 2, lower guides 143*b*, 144*b*, and 145*b*, described below, of the conveyance units 139, 140, and 141 are closed, and, in FIG. 3, the lower guides 143*b*, 144*b*, and 145*b* are opened. Hereinafter, positions of the lower guides 143*b*, 144*b*, and 145*b* illustrated in FIGS. 2 and 3 are respectively referred to as closed positions and opening positions. The lower guides 143*b*, 144*b*, and 145*b* are movable between the closed positions and the opening positions.

As illustrated in FIGS. 2 and 3, the conveyance unit 139 includes an upper guide 143*a* and the lower guide 143*b*. The upper guide 143*a* is attached to the casing 102, and the lower guide 143*b* is disposed so as to be openable and closable in a vertical direction around a shaft, which is disposed in the casing 102 on back sides of sheet surfaces of FIGS. 2 and 3. Then, the conveyance path 143 for guiding the sheet S in the sheet conveyance direction CD is formed by the upper guide 143*a* and the lower guide 143*b* positioned in the closed position.

Similarly, the conveyance unit 140, disposed downstream of the conveyance unit 139 in the sheet conveyance direction CD, includes the upper guide 144*a* and the lower guide 144*b*. The upper guide 144*a* is attached to the casing 102, and the lower guide 144*b* is disposed so as to be openable and closable in the vertical direction around a shaft, which is disposed in the casing 102 on the back sides of the sheet surfaces of FIGS. 2 and 3. Then, the conveyance path 144 for guiding the sheet S in the sheet conveyance direction CD is formed by the upper guide 144*a* and the lower guide 144*b* positioned in the closed position.

Further, the conveyance unit 141, disposed downstream of the conveyance unit 140 in the sheet conveyance direction CD, is disposed so as to straddle between the casings 101 and 102. The conveyance unit 141 includes the upper guide 145*a*, serving as a first guide, and the lower guide 145*b*, serving as a second guide. The upper guide 145*a* is attached to the casing 102, and the lower guide 145*b* is disposed so as to be openable and closable in the vertical direction around a pivot shaft 210 extending in a front-back direction of the sheet surfaces of FIGS. 2 and 3. Then, the conveyance path 145 guiding the sheet S in the sheet conveyance direction CD is formed by the upper guide 145*a* and the lower guide 145*b* positioned in the closed position. That is, in the closed position, serving as a first position, the lower guide 145*b* faces the upper guide 145*a*, and forms the conveyance path 145 with the upper guide 145*a*. In the opening position, serving as a second position, the lower guide 145*b* is more separated from the upper guide 145*a* than that in the closed position, and opens the conveyance path 145. Further, the lower guide 145*b* is positioned below the closed position in the opening position.

As illustrated in FIGS. 2 and 3, in a case where the sheet S is jammed (retained) so as to straddle between the conveyance paths 145 and 146, the controller 202 displays, on a display unit 181 of the operation display unit 180*a*, a message prompting the user to handle the jammed sheet S. For example, a message instructing the removal of the sheet S by opening a front door 401, described below, and, then, the conveyance paths 144 and 145 is displayed on the display unit 181. To be noted, it is acceptable to display either a message in which jam processing steps are instructed all at once or a plurality of messages into which the jam processing steps are divided.

FIG. 4 is a perspective view illustrating the image forming apparatus 100 in a state where the front door 401 is opened. As illustrated in FIG. 4, the image forming apparatus 100 includes the front door 401 supported so as to be openable and closable with respect to the casing 102, serving as an apparatus body, around a pivot shaft 402 extending in the vertical direction VD. In particular, the front door 401, serving as a door, is supported by a frame member 220 extending in the vertical direction VD of the casing 102 in an openable and closable manner. When viewed in a width direction orthogonal to the sheet conveyance direction CD, the upper and lower guides 145*a* and 145*b* of the conveyance unit 141 are disposed so as to overlap the frame member 220. In a state where the front door 401 is closed with respect to the casing 102, the front door 401 constitutes a part of an exterior of the image forming apparatus 100.

When the front door 401 is opened with respect to the casing 102, the user can access the lower guide 144*b* of the conveyance unit 140 and the lower guide 145*b* of the conveyance unit 141. That is, the lower guides 144*b* and 145*b* are exposed by opening the front door 401 with respect to the casing 102.

Handles 403 and 404 are respectively disposed to the lower guides 144*b* and 145*b*, and the user can bring the lower guides 144*b* and 145*b* into the opening positions by operating these handles 403 and 404.

First Illumination Device and Second Illumination Device

In this embodiment, when the sheet S has been jammed so as to straddle between the conveyance paths 145 and 146 as illustrated in FIGS. 2 and 3, a first illumination device 600A and a second illumination device 600B are disposed so as to surely guide the user to the sheet S.

Figure 6A:
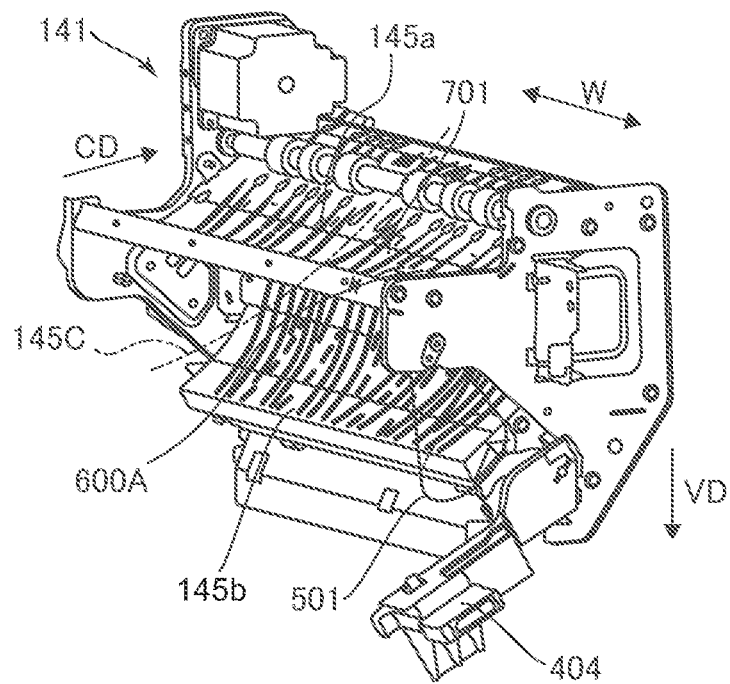
FIG. 6A is a perspective view illustrating the first illumination device disposed to the conveyance unit.
Figure 6B:
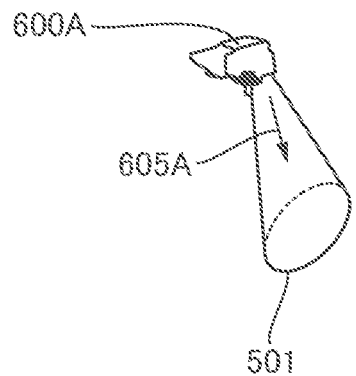
FIG. 6B is a perspective view illustrating the first illumination device.
Figure 7:
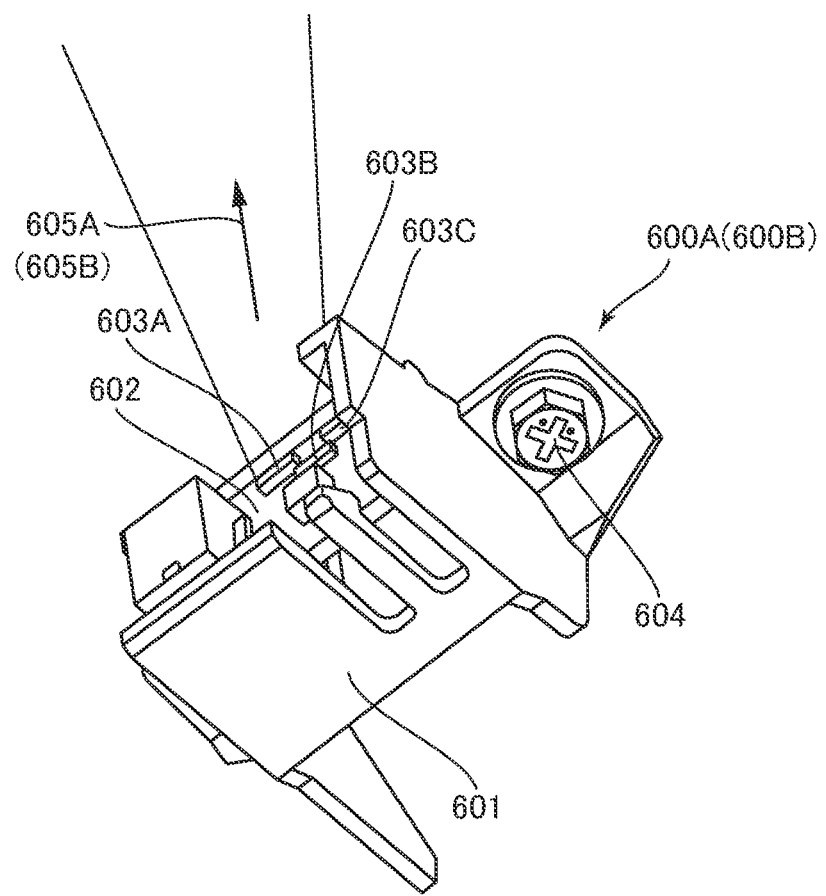
FIG. 7 is an enlarged perspective view illustrating a detailed configuration of the first illumination device.
Figure 8:
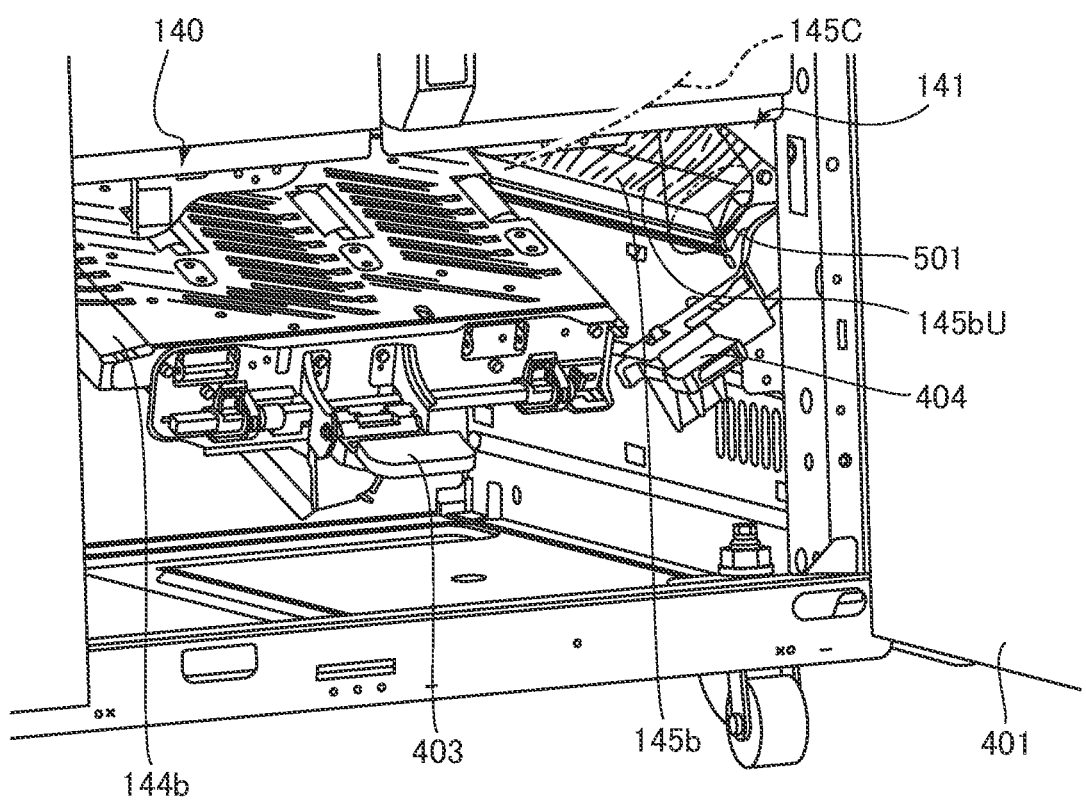
FIG. 8 is a perspective view illustrating a first illumination area illuminated by the first illumination device.
Figure 9:
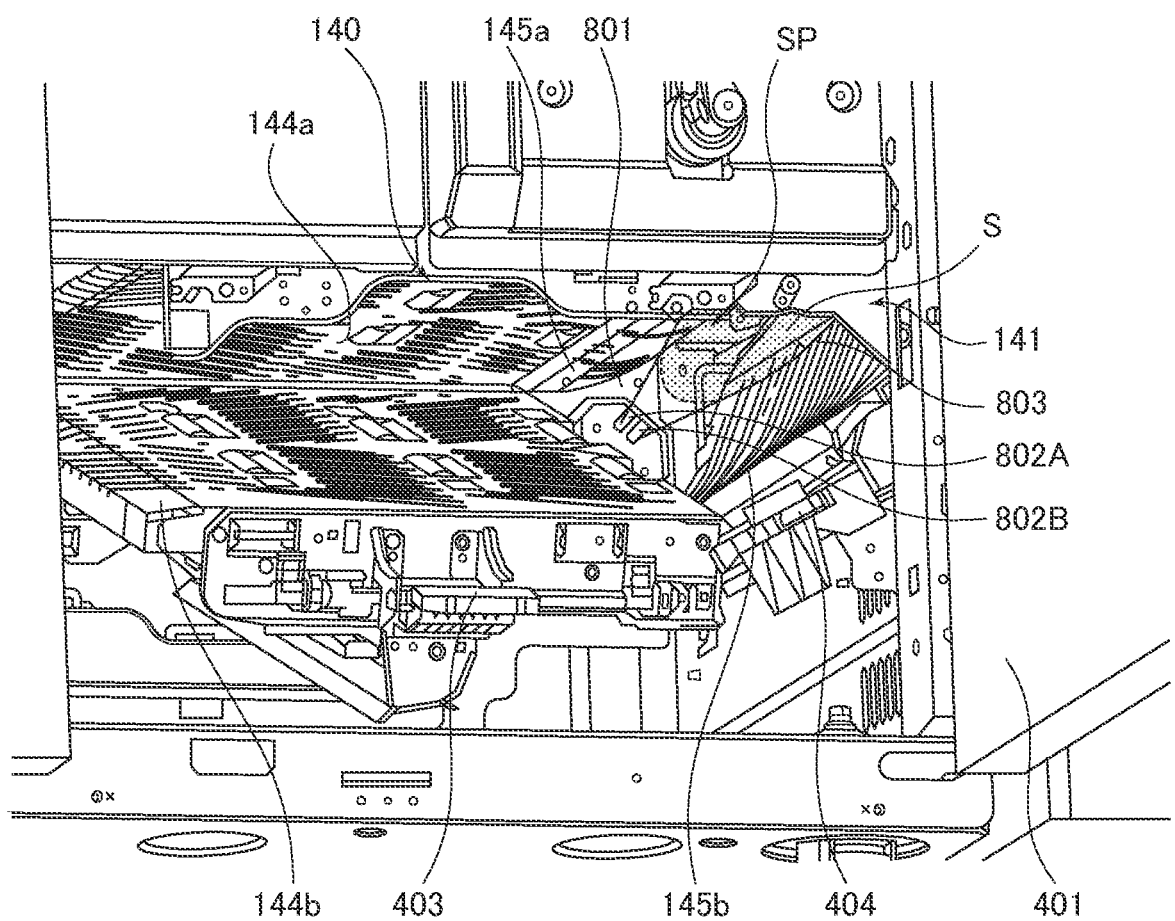
FIG. 9 is a perspective view illustrating a second illumination area illuminated by the second illumination device.

FIG. 5A is a diagram illustrating the conveyance unit 141 as viewed from an arrow V direction in FIG. 4, and FIG. 5B is a perspective view illustrating illumination directions of the first and second illumination devices 600A and 600B. FIG. 6A is a perspective view illustrating the first illumination device 600A disposed to the conveyance unit 141, and FIG. 6B is a perspective view illustrating the first illumination device 600A. FIG. 7 is an enlarged perspective view illustrating a detailed configuration of the first illumination device 600A. FIG. 8 is a perspective view illustrating a first illumination area 501 illuminated by the first illumination device 600A. FIG. 9 is a perspective view illustrating a second illumination area 803 illuminated by the second illumination device 600B.

As illustrated in FIGS. 5A and 6A, the first and second illumination devices 600A and 600B are disposed to the conveyance unit 141. The first illumination device 600A is attached to an upper surface 701 of the upper guide 145*a* of the conveyance unit 141. In particular, the first illumination device 600A is disposed to a side of a first end of the upper surface 701, i.e., to the front side of the image forming apparatus 100, in the width direction W orthogonal to the sheet conveyance direction CD. In other words, the first illumination device 600A is disposed closer to a side of the front door 401 than a conveyance center line 145C of the conveyance path 145 in the width direction W.

An opening 901 is disposed in the upper guide 145*a*, and the first illumination device 600A illuminates the lower guide 145*b* via the opening 901. In particular, as illustrated in FIG. 8, the first illumination device 600A illuminates the first illumination area 501 of the lower guide 145*b* positioned in the opening position, and the first illumination area 501 is closer to the front door 401 than the conveyance center line 145C.

Further, as illustrated in FIGS. 5A and 9, the second illumination device 600B is attached to a back surface 801*a* of a back-side plate 801 of the casing 102. The back-side plate 801, serving as a side plate, is disposed on a side opposite to the front door 401 in the width direction W across the conveyance path 145. That is, the first illumination device 600A is disposed on a first side with respect to the conveyance center line 145C in the width direction W, and the second illumination device 600B is disposed on a second side with respect to the conveyance center line 145C in the width direction W.

Openings 802A and 802B are disposed in the back-side plate 801. The second illumination device 600B illuminates a space SP (refer to FIG. 9) between the upper guide 145*a* and the lower guide 145*b* positioned in the second position via the openings 802A and 802B. The illumination area of the second illumination device 600B is indicated as the second illumination area 803 in FIGS. 5B and 9, and the jammed sheet S is positioned in the second illumination area 803. That is, the second illumination device 600B illuminates the sheet S jammed so as to straddle between the conveyance paths 145 and 146.

Further, in FIGS. 5B to 7, the illumination directions of the first and second illumination devices 600A and 600B are respectively schematically illustrated as the illumination directions 605A and 605B. These illumination directions 605A and 605B each are a direction extending from an origin of the light emitted from each of the first and second illumination devices 600A and 600B to a center of each of illumination ranges.

The illumination direction 605A of the first illumination device 600A is a direction containing a downward direction component with respect to the vertical direction VD, and the illumination direction 605B of the second illumination device 600B is a direction containing an upward direction component with respect to the vertical direction VD. That is, the illumination directions 605A and 605B are different from each other.

As illustrated in FIG. 7, the first illumination device 600A includes a holder 601, an electric board 602 attached to the holder 601, and light emitting elements 603A, 603B, and 603C installed on the electric board 602. Then, the first illumination device 600A is, as described above, attached to the upper surface 701 of the upper guide 143*a* by a screw 604.

The second illumination device 600B is the same as the first illumination device 600A in a configuration, and is, as described above, attached to the back-side plate 801 by the screw 604. While the first and second illumination devices 600A and 600B are the same in the configuration, the illumination directions 605A and 605B are different from each other since orientations of installation surfaces, i.e., the upper surface 701 of the upper guide 143a and the back surface 801a of the back-side plate 801, are different from each other.

Jam Processing

Next, jam processing so as to remove the sheet S which is straddling between the conveyance paths 145 and 146 will be described in detail. As illustrated in FIG. 1, a sensor 300 for detecting the sheet in the conveyance path 145 is disposed in the image forming apparatus 100. To be noted, if sensors can detect that the sheet S is jammed in a manner straddling between the conveyance paths 145 and 146, a disposition, a configuration, and a number of such sensors are not limited. For example, in a case where sensors are disposed on each of the conveyance paths 144 and 146, and in a case where the sensor, disposed in the conveyance path 146, does not detect the sheet after a predetermined time has passed from when the sensor, disposed in the conveyance path 144, detected a passage of the sheet, it can be judged that the sheet has been jammed.

In a case where, based on a detection result of the sensor 300, the controller 202, serving as a control unit, judges that the sheet S is jammed (retained) so as to straddle between the conveyance paths 145 and 146, the controller 202 lights the first and second illumination devices 600A and 600B. At this time, the first illumination device 600A blinks, and the second illumination device 600B is continuously lit.

Then, on the display unit 181 of the operation display unit 180, the controller 202 displays the message prompting the user to remove the jammed sheet S. For example, the display unit 181 displays the message instructing the user to remove the sheet S by opening the front door 401 and, then, opening the conveyance paths 144 and 145.

Based on the message displayed on the display unit 181, the user opens the front door 401 with respect to the casing 102, and then moves the lower guides 144b and 145b to the opening position. Then, as illustrated in FIG. 8, the user can visually confirm that the first illumination area 501 is illuminated by the first illumination device 600A.

The first illumination area 501 is an area of the lower guide 145b positioned in the opening position, and is an area closer to the front door 401 than the conveyance center line 145C. Then, since the first illumination device 600A is attached to the upper surface 701 (refer to FIG. 6A) of the upper guide 145a, the first illumination device 600A illuminates an upper surface 145bu of the lower guide 145b from above. Therefore, the user can visually confirm the light of the first illumination area 501 even in a state where the user stands right in front of the casing 102.

Then, the user can recognize a place requiring the jam processing by the light of the first illumination area 501, and looks at the lower guide 145b. Especially, as illustrated in FIG. 4, the upper and lower guides 145a and 145b of the conveyance unit 141 are disposed at positions which are hidden by the frame member 200 and hard to be seen. However, the front side of the lower guide 145b in the width direction W is illuminated by the first illumination area 501, so that the user can surely recognize the place requiring the jam processing.

Next, the user squats down in front of the casing 102 so as to check the conveyance path 145 positioned in a relatively low position. At this time, as illustrated in FIG. 9, the second illumination device 600B is illuminating the space SP between the upper guide 145a and the lower guide 145b, positioned in the second position, from a direction different from the illumination direction of the first illumination device 600A. The space SP is a space which appears by opening the conveyance path 145, and at least a part of the sheet S is positioned in the space SP. Therefore, the user can easily find the jammed sheet S.

As described above, in this embodiment, the first illumination device 600A guides the user toward the sheet S which has been jammed in a recessed position in the image forming apparatus 100. Then, since at least a part of the jammed sheet S is illuminated by the second illumination device 600B, the user can easily find the sheet S. Thereby, it is possible to improve jam processability.

Second Embodiment

While a second embodiment of this disclosure will be described next, the second embodiment is different from the first embodiment with respect to a position in which a second illumination device 1600B is disposed. Therefore, configurations similar to the first embodiment will be described by omitting illustrations or by putting the same reference characters on drawings herein.

Figure 10:
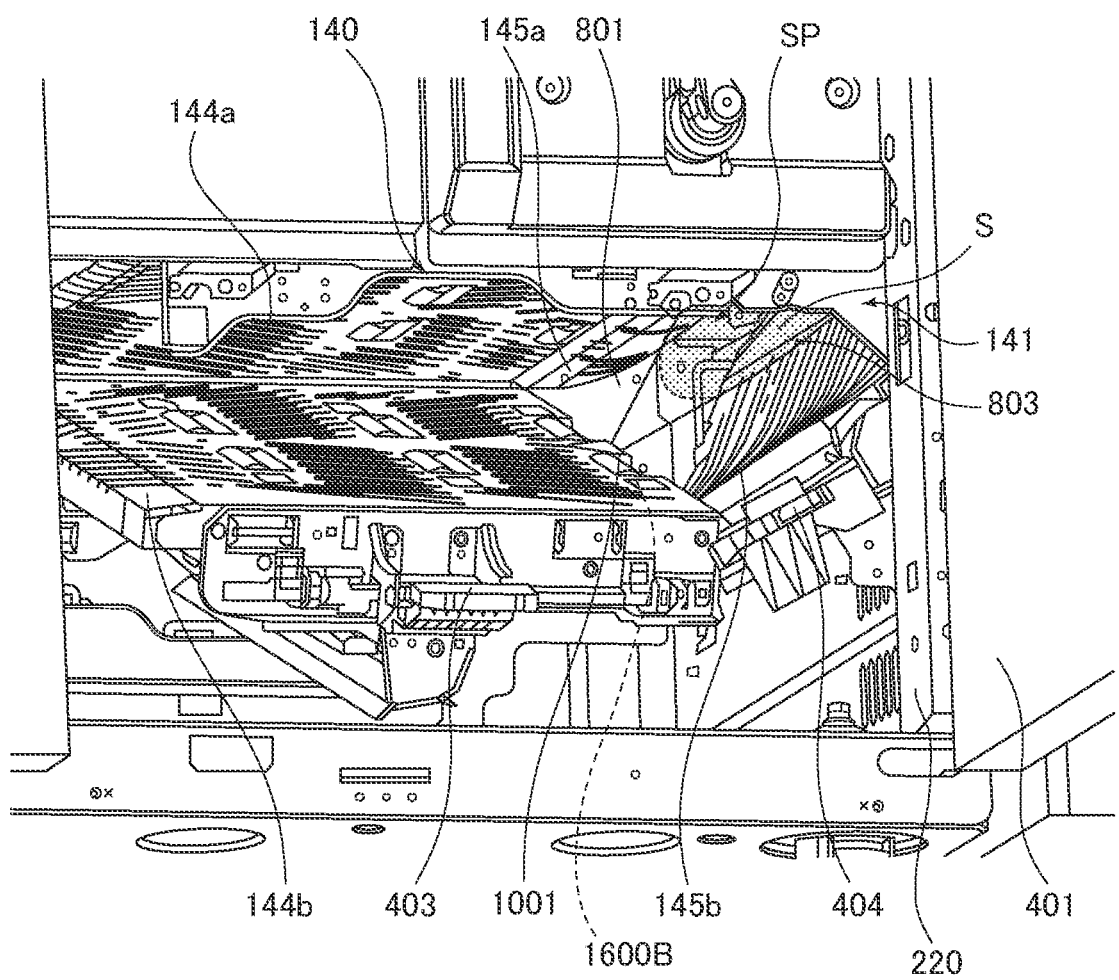
FIG. 10 is a perspective view illustrating a disposition of a second illumination device of a second embodiment.

As illustrated in FIG. 10, an opening 1001 is disposed in the lower guide 144b of the conveyance unit 140. Further, the second illumination device 1600B is attached to the lower guide 144b. The second illumination device 1600B is similar to the second illumination device 600B of the first embodiment in a configuration.

Then, the second illumination device 1600B illuminates the space SP between the upper guide 145a and the lower guide 145b, positioned in the second position, via the opening 1001. Since the second illumination device 1600B is not attached to the back-side plate 801 in this embodiment, it is possible to miniaturize the size of the image forming apparatus 100 in the width direction W.

To be noted, it is acceptable to secure the first illumination device 600A to either the upper guide 145a, similarly to the first embodiment, or other places. For example, it is acceptable to secure the first illumination device 600A to the frame member 220. Further, it is also acceptable to secure the second illumination device to other places, not limited to the back-side plate 801 and the lower guide 144b.

OTHER EMBODIMENTS

To be noted, while, in any of the embodiments described above, the lower guide 145b is configured to pivot around the pivot shaft 210 extending in the width direction as the center, it is not limited to this. For example, it is acceptable to configure such that, similarly to the lower guides 143b and 144b, the lower guide 145b pivots around a shaft disposed on the back side of the image forming apparatus 100. Further, it is acceptable that the lower guide 145b is not configured to pivot, but that the lower guide 145b is configured to be removed from the casings 101 and 102 when the conveyance path 145 is to be opened.

Further, while, in any of the embodiments described above, the lower guides 143b, 144b, and 145b are configured to be opened with respect to the upper guides 143a, 144a, and 145a, it is not limited to this. For example, it is acceptable that the lower guides 143b, 144b, and 145b are configured not to move, and that the conveyance paths 143, 144, and 145 are configured to be opened by moving the upper guides 143a, 144a, and 145a. In this case, it is acceptable to configure such that the first illumination device 600A illuminates the upper guide 145a.

Further, while, in any of the embodiments described above, the first illumination device 600A illuminates in the direction containing the downward direction component with respect to the vertical direction VD and the second illumination device 600B illuminates in the direction containing the upward direction component with respect to the vertical direction VD, it is not limited to this. That is, if the illumination directions of the first and second illumination devices 600A and 600B are different from each other, the first and second illumination devices 600A and 600B may illuminate in any of directions.

Further, while, in any of the embodiments described above, when the sheet S has been j ammed, the first illumination device 600A blinks and the second illumination device 600B is continuously lit, it is not limited to this. For example, it is acceptable that both of the first and second illumination devices 600A and 600B either brink or are continuously lit. Further, while the first and second illumination devices 600A and 600B are configured to be lit only when the sheet S has been jammed in the conveyance path 145, it is not limited to this. For example, it is acceptable that the first and second illumination devices 600A and 600B are always lit when the image forming apparatus 100 is powered on.

Further, while, in any of the embodiments described above, the upper and lower guides 145a and 145b are disposed so as to, when viewed in the width direction W, overlap the frame member 220, it is not limited to this. For example, it is acceptable that, when viewed in the width direction W, the upper and lower guides 145a and 145b do not overlap the frame member 220.

Further, while, in any of the embodiments described above, the drawer unit 142 is disposed so as to be adjacent to the downstream side of the conveyance unit 141 in the sheet conveyance direction CD, it is not limited to this. For example, it is acceptable that the drawer unit 142 is disposed so as to be adjacent to the upstream side of the conveyance unit 141 in the sheet conveyance direction CD.

Further, while, in any of the embodiments described above, the description has been made using the electrophotographic image forming apparatus 100, this disclosure is not limited to this. For example, this disclosure may also be applied to an ink-jet image forming apparatus that forms images on sheets by injecting an ink liquid from its nozzle.

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-013132, filed Jan. 31, 2022, which is hereby incorporated by reference herein in its entirety.

What is claimed is:

1. An image forming apparatus forming an image on a sheet, the image forming apparatus comprising:
   an apparatus body;
   a door provided so as to be openable and closable with respect to the apparatus body, the door constituting a part of an exterior of the image forming apparatus;
   a first guide;
   a second guide including a facing surface configured to face the first guide, the second guide being configured to move from a first position to a second position so as to open a conveyance path, the first position being a position in which the facing surface of the second guide forms the conveyance path with the first guide, the second position being a more separated position from the first guide than the first position, the second guide being exposed in a case where the door is opened with respect to the apparatus body;
   a first illumination device configured to illuminate the facing surface of the second guide positioned in the second position; and
   a second illumination device configured to illuminate in a direction different from a direction in which the first illumination device illuminates, the second illumination device being configured to illuminate a space between the first guide and the second guide positioned in the second position.

2. The image forming apparatus according to claim 1, wherein the second guide positioned in the second position is positioned below the first position.

3. The image forming apparatus according to claim 2, wherein the second guide is configured to pivot between the first position and the second position around a pivot shaft extending in a width direction orthogonal to a sheet conveyance direction of a sheet which is conveyed in the conveyance path.

4. The image forming apparatus according to claim 2, wherein the first illumination device is configured to illuminate in a direction containing a downward direction component with respect to a vertical direction, and
   wherein the second illumination device is configured to illuminate in a direction containing an upward direction component with respect to the vertical direction.

5. The image forming apparatus according to claim 2, wherein the first illumination device is attached to an upper surface of the first guide and is configured to illuminate the second guide through an opening formed in the first guide.

6. The image forming apparatus according to claim 1, wherein the second illumination device is attached to a side plate disposed on a side opposite to the door across the conveyance path in a width direction orthogonal to a sheet conveyance direction of a sheet which is conveyed in the conveyance path.

7. The image forming apparatus according to claim 1, wherein the first illumination device is disposed on a first side with respect to a conveyance center line of the conveyance path in a width direction orthogonal to a sheet conveyance direction of a sheet which is conveyed in the conveyance path, and
wherein the second illumination device is disposed on a second side with respect to the conveyance center line in the width direction.

8. The image forming apparatus according to claim 1, wherein the first illumination device is configured to blink, and
wherein the second illumination device is configured to be continuously lit.

9. The image forming apparatus according to claim 1, wherein the first illumination device and the second illumination device are configured to be lit when the sheet is being retained in the conveyance path, and
wherein the second illumination device is configured to illuminate at least a part of the sheet which is being retained in the conveyance path.

10. The image forming apparatus according to claim 1, further comprising:
a sensor configured to detect the sheet in the conveyance path; and
a control unit configured to light the first illumination device and the second illumination device in a case where, based on a detection result of the sensor, it is judged that the sheet is being retained in the conveyance path.

11. The image forming apparatus according to claim 1, further comprising a drawer unit disposed adjacent to the first guide and the second guide in a sheet conveyance direction of a sheet which is conveyed in the conveyance path and being configured to be drawn out with respect to the apparatus body.

12. The image forming apparatus according to claim 1, wherein the apparatus body includes a frame member extending in a vertical direction,
wherein the frame member is configured to support the door in an openable and closable manner, and
wherein, when viewed in a width direction orthogonal to a sheet conveyance direction of a sheet which is conveyed in the conveyance path, the first guide and the second guide are disposed in positions overlapping the frame member.

13. The image forming apparatus according to claim 1, wherein the first illumination device is configured to illuminate a door side of the facing surface of the second guide positioned in the second position, the door side of the facing surface being closer to the door than a conveyance center line of the conveyance path in a width direction orthogonal to a sheet conveyance direction of a sheet which is conveyed in the conveyance path.

* * * * *